US012631745B2

(12) United States Patent
Saito et al.

(10) Patent No.: US 12,631,745 B2
(45) Date of Patent: May 19, 2026

(54) COMMUNICATION DEVICE, DISTANCE MEASURING DEVICE, AND AUTHENTICATION METHOD IN COMMUNICATION DEVICE

(71) Applicant: ALPS ALPINE CO., LTD., Tokyo (JP)

(72) Inventors: Toshihiko Saito, Miyagi (JP); Daisuke Takai, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 224 days.

(21) Appl. No.: 18/643,246

(22) Filed: Apr. 23, 2024

(65) Prior Publication Data

US 2026/0003065 A1 Jan. 1, 2026

Related U.S. Application Data

(63) Continuation of application No. PCT/JP2022/038181, filed on Oct. 13, 2022.

(30) Foreign Application Priority Data

Nov. 10, 2021 (JP) ................................. 2021-183686

(51) Int. Cl.
*G01S 13/84* (2006.01)
(52) U.S. Cl.
CPC ..................................... *G01S 13/84* (2013.01)
(58) Field of Classification Search
CPC ........ G01S 13/84; G01S 11/02; G01S 13/765; B60R 25/24
See application file for complete search history.

(56) References Cited

U.S. PATENT DOCUMENTS 11,104,300 B2 * 8/2021 Kim ......................... B60R 25/01
2002/0181605 A1 * 12/2002 Nation .................. H04L 27/366
375/295

(Continued)

FOREIGN PATENT DOCUMENTS

JP 2019-128341 8/2019
JP 2020-120301 8/2020

OTHER PUBLICATIONS

International Search Report for PCT/JP2022/038181 mailed on Dec. 27, 2022.

*Primary Examiner* — William Kelleher
*Assistant Examiner* — Kenneth W Good
(74) *Attorney, Agent, or Firm* — IPUSA, PLLC

(57) ABSTRACT

A communication device includes a processor configured to perform a sharing process in which data relating to a first frequency and a second frequency is shared with an external device, the first frequency and the second frequency being configured to be used to communicate with the external device, transmit and receive a high frequency signal with respect to the external device, and authenticate the external device as an authorized device, upon occurrence of a condition in which the processor receives the high frequency signal at the first frequency from the external device, after transmitting the high frequency signal at the first frequency to the external device, in conjunction with a condition in which the processor receives the high frequency signal at the second frequency from the external device, after transmitting the high frequency signal at the first frequency to the external device.

7 Claims, 8 Drawing Sheets

(56) References Cited

U.S. PATENT DOCUMENTS

| | | | |
|---|---|---|---|
| 2007/0273575 A1* | 11/2007 | Yang ........................ | G01S 13/36 |
| | | | 342/127 |
| 2015/0198706 A1* | 7/2015 | Dolgin .................... | G01S 13/42 |
| | | | 342/202 |
| 2019/0227141 A1 | 7/2019 | Nishikawa | |
| 2024/0257590 A1* | 8/2024 | Sanji .................. | G07C 9/00309 |

* cited by examiner

| ID | ADJUSTMENT |
|----|------------|
| f0 | 0 Hz |
| f1 | f0+1 kHz |
| f2 | f0−1 kHz |
| f3 | f0+5 kHz |
| f4 | f0−5 kHz |
| f5 | f0+10 Hz |

FIG.8

| | TRANSMISSION FROM 100A TO 100B | TRANSMISSION FROM 100B TO 100A |
|---|---|---|
| FIRST TIME | f0 (F0) | f0 (F0) |
| SECOND TIME | f0 (F0) | f1 (F1) |

FIG.9

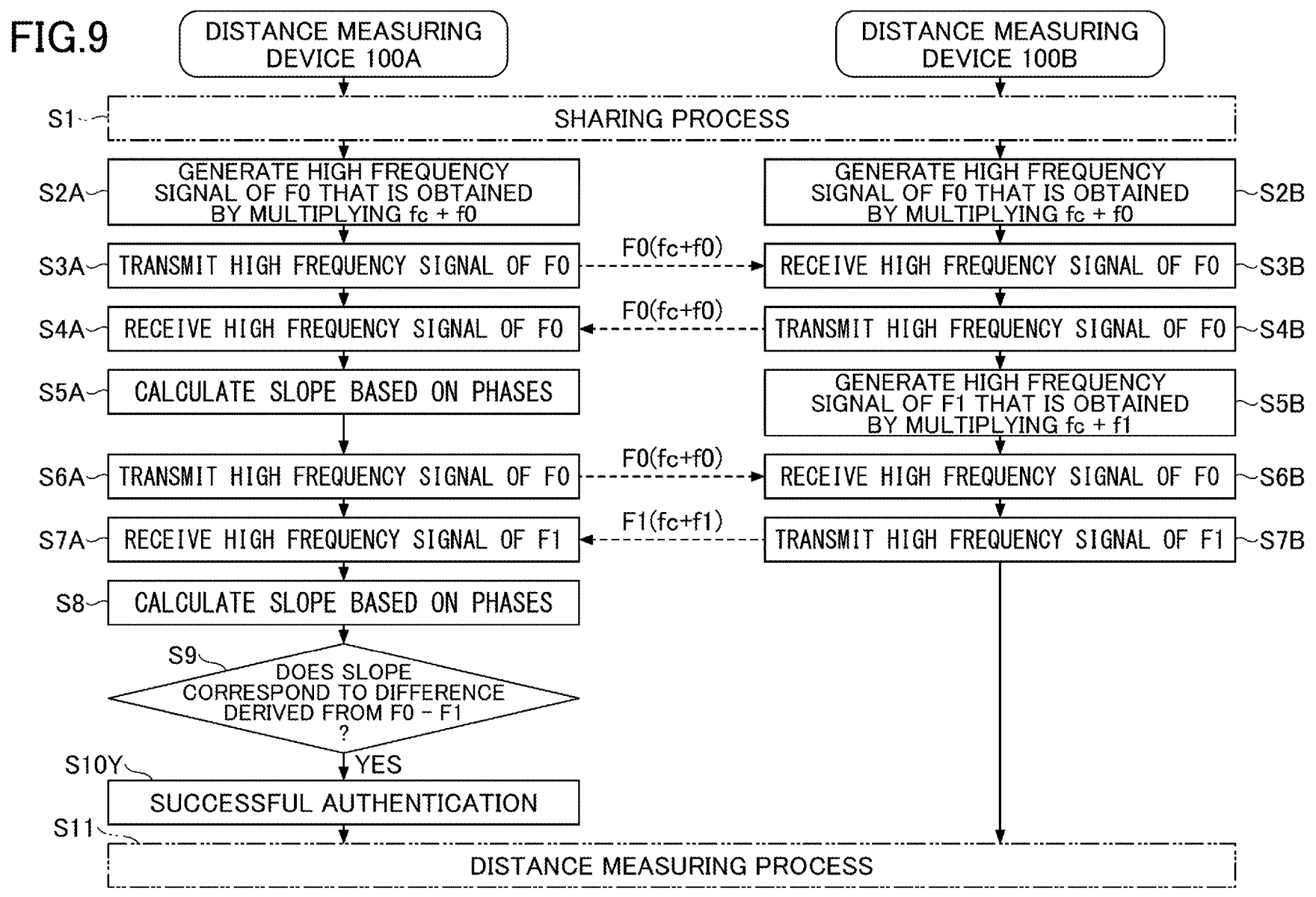

DISTANCE MEASURING DEVICE 100A

DISTANCE MEASURING DEVICE 100B

SHARING PROCESS

S1

S2A — GENERATE HIGH FREQUENCY SIGNAL OF F0 THAT IS OBTAINED BY MULTIPLYING fc + f0

S2B — GENERATE HIGH FREQUENCY SIGNAL OF F0 THAT IS OBTAINED BY MULTIPLYING fc + f0

S3A — TRANSMIT HIGH FREQUENCY SIGNAL OF F0

F0(fc+f0)

S3B — RECEIVE HIGH FREQUENCY SIGNAL OF F0

S4A — RECEIVE HIGH FREQUENCY SIGNAL OF F0

F0(fc+f0)

S4B — TRANSMIT HIGH FREQUENCY SIGNAL OF F0

S5A — CALCULATE SLOPE BASED ON PHASES

S5B — GENERATE HIGH FREQUENCY SIGNAL OF F1 THAT IS OBTAINED BY MULTIPLYING fc + f1

S6A — TRANSMIT HIGH FREQUENCY SIGNAL OF F0

F0(fc+f0)

S6B — RECEIVE HIGH FREQUENCY SIGNAL OF F0

S7A — RECEIVE HIGH FREQUENCY SIGNAL OF F1

F1(fc+f1)

S7B — TRANSMIT HIGH FREQUENCY SIGNAL OF F1

S8 — CALCULATE SLOPE BASED ON PHASES

S9 — DOES SLOPE CORRESPOND TO DIFFERENCE DERIVED FROM F0 – F1 ?

S10Y — YES

SUCCESSFUL AUTHENTICATION

S11

DISTANCE MEASURING PROCESS

COMMUNICATION DEVICE, DISTANCE MEASURING DEVICE, AND AUTHENTICATION METHOD IN COMMUNICATION DEVICE

CROSS-REFERENCE TO RELATED APPLICATIONS

This application is a continuation application of International Application No. PCT/JP2022/038181, filed on Oct. 13, 2022, and designating the U.S., which is based upon and claims priority to Japanese Patent Application No. 2021-183686, filed on Nov. 10, 2021, the entire contents of which are incorporated herein by reference.

BACKGROUND

1. Field of the Invention

The present disclosure relates to a communication device, a distance measuring device, and an authentication method in the communication device.

2. Description of the Related Art

A conventional distance measuring device includes a first device, a second device, and an arithmetic unit. The first device includes a first transceiver that transmits a first known signal and a second known signal, the first known signal corresponds to a first carrier frequency, and the second known signal corresponds to a second carrier frequency different from the first carrier frequency. The first transceiver receives a third known signal and a fourth known signal, the third known signal corresponds to the first carrier frequency, and the fourth known signal corresponding to the second carrier frequency. The second device includes a second transceiver that transmits the third known signal and the fourth known signal, and that receives the first known signal and the second known signal. The arithmetic unit determines a distance between the first device and the second device, based on phases of the first to fourth known signals. The first transceiver and the second transceiver perform a total of four transmit-receive cycles that include a single transmit-receive cycle for each of the first and third known signals and a single transmit-receive cycle for each of the second and fourth known signals (see Patent Document 1).

RELATED-ART DOCUMENT

Patent Document

[Patent Document 1] Japanese Unexamined Patent Application Publication No. 2019-128341

SUMMARY

A communication device according to an embodiment of the present disclosure includes a processor configured to perform a sharing process in which data relating to a first frequency and a second frequency is shared with an external device, the first frequency and the second frequency being configured to be used to communicate with the external device, transmit and receive a high frequency signal with respect to the external device, and authenticate the external device as an authorized device, upon occurrence of a condition in which the processor receives the high frequency signal at the first frequency from the external device, after transmitting the high frequency signal at the first frequency to the external device, in conjunction with a condition in which the processor receives the high frequency signal at the second frequency from the external device, after transmitting the high frequency signal at the first frequency to the external device.

BRIEF DESCRIPTION OF THE DRAWINGS

FIG. 8 is a diagram showing an example of shared adjustment data.

FIG. 9 is a flowchart showing a sharing process, a frequency setting process, an authentication process, and a ranging process, under a normal condition.

DETAILED DESCRIPTION

The conventional distance measuring device, recognized by the inventors of this application, is applicable to a smart-key system of a vehicle, and takes measures against a relay attack. However, a vehicle-side device and the smart key communicate with each other in a predetermined fixed transmission order and at a fixed transmission frequency, and as a result, communication confidentiality is not assured. That is, sufficient measures against the relay attack are not taken.

In view of the situation recognized by the inventors, a communication device, a distance measuring device, and an authentication method in the communication device can be provided to improve communication confidentiality.

Hereinafter, embodiments will be described using the communication device, the distance measuring device, and the authentication method in the communication device.

Embodiments

Figure 1:
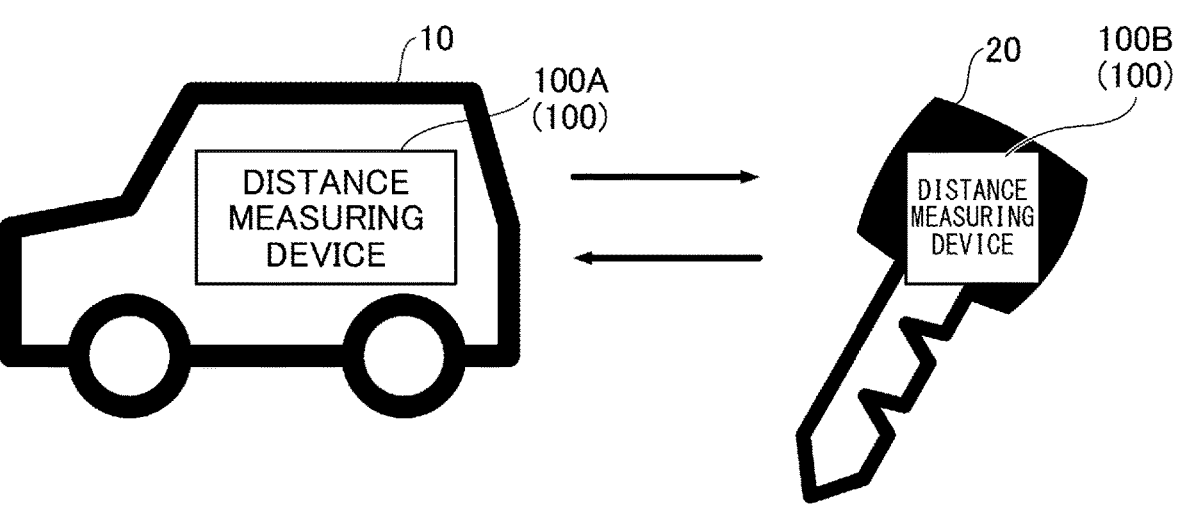
FIG. 1 is a diagram showing a vehicle 10 and a smart key 20 in which distance measuring devices 100A and 100B are respectively mounted according to an embodiment.

FIG. 1 is a diagram illustrating a vehicle 10 and a smart key 20 in which distance measuring devices 100A and 100B are respectively mounted according to an embodiment. In an example of FIG. 1, the distance measuring device 100A is mounted in a smart-key system that is provided in the vehicle 10, and the distance measuring device 100B is mounted in the smart key 20 of the vehicle 10. The distance measuring devices 100A and 100B communicate with each other by BLE (Bluetooth low energy) (registered trademark), for example.

At least one of the distance measuring device 100A of the vehicle 10 or the distance measuring device 100B of the smart key 20 measures a distance between the vehicle 10 and the smart key 20. Any door, a trunk, or the like of the vehicle 10 is unlocked when the distance measured by the distance measuring device 100A or 100B is an appropriate distance.

In the present embodiment, in an example, the distance measuring device 100A of the vehicle 10 performs ranging, and notifies the distance measuring device 100B of the smart key 20 of a ranging result. The distance measuring devices 100A and 100B have the same configuration, for example. In this arrangement, in the following description, when the distance measuring devices 100A and 100B are not distinguished, they are simply referred to as distance measuring devices 100. The distance measuring device 100B that does not perform ranging, among the distance measuring device 100A of the vehicle 10 and the distance measuring device 100B of the smart key 20, is an example of another device. In this example, the distance measuring device 100B of the smart key 20 is an example of another device.

<Configuration of Distance Measuring Device 100A>

Figure 2:
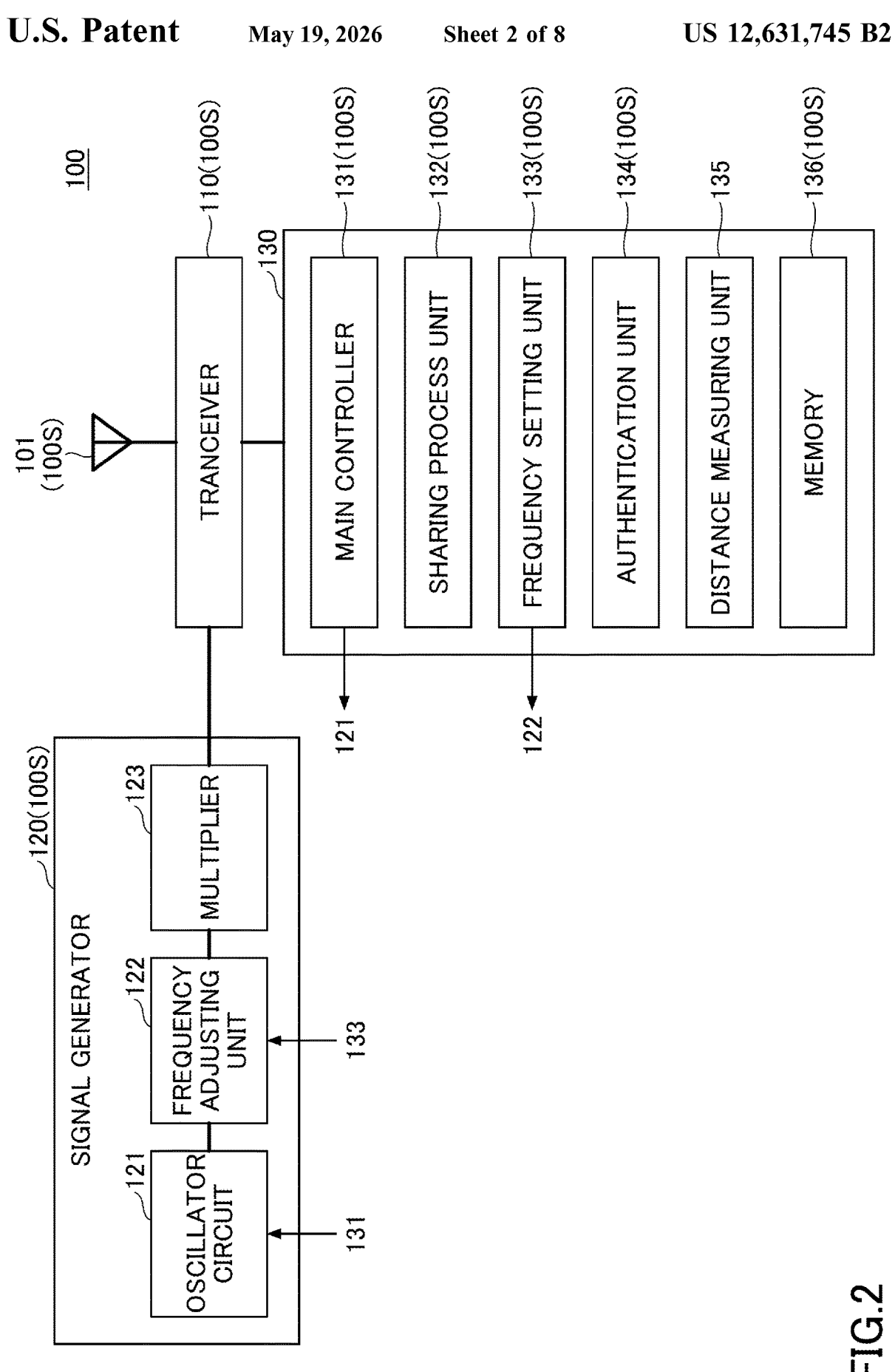
FIG. 2 is a diagram showing the distance measuring device 100A according to the embodiment.

FIG. 2 is a diagram showing the distance measuring device 100A according to the embodiment. As described above, the distance measuring device 100A of the vehicle 10 and the distance measuring device 100B of the smart key 20 have the same configuration. Hereinafter, the distance measuring device 100A that performs ranging will be described.

The distance measuring device 100A includes an antenna 101, a transceiver 110, a signal generator 120, and a micro-computer unit (MCU) 130. The antenna 101 is connected to the transceiver 110.

A device that is obtained by removing a distance measuring unit 135 from the distance measuring device 100A according to the embodiment is a communication device 100S according to the embodiment. That is, the communication device 100S includes the components other than the distance measuring unit 135, namely, the antenna 101, the transceiver 110, the signal generator 120, and a portion of the MCU 130. In the following, a symbol 100S is put in parentheses for the antenna 101, the transceiver 110, the signal generator 120, and components of the MCU 130 other than the distance measuring unit 135.

The transceiver 110 is connected to the antenna 101, the signal generator 120, and the MCU 130. The transceiver 110 includes a transmission system circuit with a transmission power amplifier (PA) and the like, and includes a reception system circuit with a reception low noise amplifier (LNA) and the like. The transceiver 110 further includes a switch or the like that switches between the transmission system circuit and the reception system circuit.

The transceiver 110 transmits a high frequency signal (continuous wave) that is output from the signal generator 120, to the distance measuring device 100B via the antenna 101, and receives the high frequency signal (continuous wave) transmitted from the distance measuring device 100B via the antenna 101. In addition to transmitting and receiving the high frequency signal, the transceiver 110 transmits and receives data or the like with respect to the distance measuring device 100B, by using a packet signal of BLE (Bluetooth low energy (trademark)), for example. The frequency of each of the high frequency signal and the packet signal is in the 2.4 GHz band, for example. The 2.4 GHz band has a plurality of channels having different frequencies.

The signal generator 120 includes an oscillator circuit 121, a frequency adjusting unit 122, and a multiplier 123. The oscillator circuit 121 is an oscillator (OSC), and oscillates a high frequency signal (continuous wave) at 32 MHz, for example. The frequency of 32 MHz is an example of a fundamental frequency, and is an oscillation frequency of the oscillator circuit 121. Each of the frequency adjusting unit 122 and the multiplier 123 is implemented by an integrated circuit (IC), for example. Each of the frequency adjusting unit 122 and the multiplier 123 is expressed by a block of a function that the IC performs.

The frequency adjusting unit 122 adjusts the frequency of the high frequency signal oscillated by the oscillator circuit 121. The frequency adjusting unit 122 changes the frequency of the high frequency signal that is input from the oscillator circuit 121, to a frequency that is obtained by adding an adjustment set by the frequency setting unit 133 of the MCU 130, to the fundamental frequency, and then the frequency adjusting unit 122 outputs the high frequency signal with the changed frequency to the multiplier 123. The frequency adjusting unit 122 changes the frequency of the high frequency signal by changing a parameter corresponding to capacitance that is defined by two electrodes of a crystal oscillator.

The multiplier 123 multiplies the frequency (the fundamental frequency plus the adjustment) of the high frequency signal that is input from the frequency adjusting unit 122, and outputs the high frequency signal with a frequency in the 2.4 GHz band, to the transceiver 110. The multiplier 123 multiplies the frequency of the high frequency signal by changing a parameter expressing a frequency magnification.

The MCU 130 includes a main controller 131, a sharing process unit 132, a frequency setting unit 133, an authentication unit 134, a distance measuring unit 135, and a memory 136. The memory 136 is an example of a storage. The MCU 130 is implemented by, for example, a micro-computer th at includes a central processing unit (CPU), a random access memory (RAM), a read only memory (ROM), an internal bus, and the like. The main controller 131, the sharing process unit 132, the frequency setting unit 133, the authentication unit 134, and the distance measuring unit 135, which have functions of a program executed by the MCU 130, are expressed by functional blocks. The memory 136 functionally expresses a memory of the MCU 130.

The main controller 131 is a processor that performs a process other than processes that are performed by the sharing process unit 132, the frequency setting unit 133, the authentication unit 134, and the distance measuring unit 135, and that governs a control process by the MCU 130. The main controller 131 controls the operation of the oscillator circuit 121 in the signal generator 120.

The sharing process unit 132 performs a sharing process in which shared adjustment data is shared between the distance measuring devices 100A and 100B. The shared adjustment data indicates a rule regarding frequencies that are used when the distance measuring devices 100A and 100B transmit high frequency signals to each other in the authentication process. The shared adjustment data will be described below in detail with reference to FIG. 8. The sharing process will be described below in detail with reference to FIG. 9.

The frequency setting unit 133 performs a frequency setting process in which an adjustment to be added to the fundamental frequency by the frequency adjusting unit 122 of the signal generator 120 is set based on data, relating to the frequency of the high frequency signal, that is shared between the distance measuring devices 100A and 100B in the sharing process by the sharing process unit 132.

When the distance measuring devices 100A and 100B transmit high frequency signals to each other for ranging, the authentication unit 134 performs the authentication process of authenticating, based on the relationship between frequencies of a transmitted high frequency signal and a received high frequency signal, a communication partner of the distance measuring device 100A as the distance measuring device 100B that is another authorized device. The distance measuring device 100B is an example of another authorized device. In the authentication process, the authentication unit 134 determines whether the communication partner is the distance measuring device 100B or the other device (which is an example of an unauthorized device) other than the distance measuring device 100B. The authentication process will be described below in detail with reference to FIG. 8.

The distance measuring unit 135 performs a ranging process of measuring a distance to the measuring device 100B, when authentication is successfully performed by the authentication unit 134. The distance measuring unit 135 performs TOA (time of arrival) ranging, for example. The distance measuring unit 135 determines the relationship between a phase and a frequency, based on a difference in frequency between high frequency signals that are received from the distance measuring device 100B, and calculates and outputs the distance that is obtained from the relationship between the phase and the frequency.

The memory 136 stores one or more programs and data necessary for the main controller 131 to execute various processes, and stores one or more programs, data, and the like necessary for the sharing process unit 132, the frequency setting unit 133, the authentication unit 134, and the distance measuring unit 135 to perform processes that include the sharing process, the frequency setting process, the authentication process, and the distance measuring process.

<Communication Process for Ranging>

Figure 3:
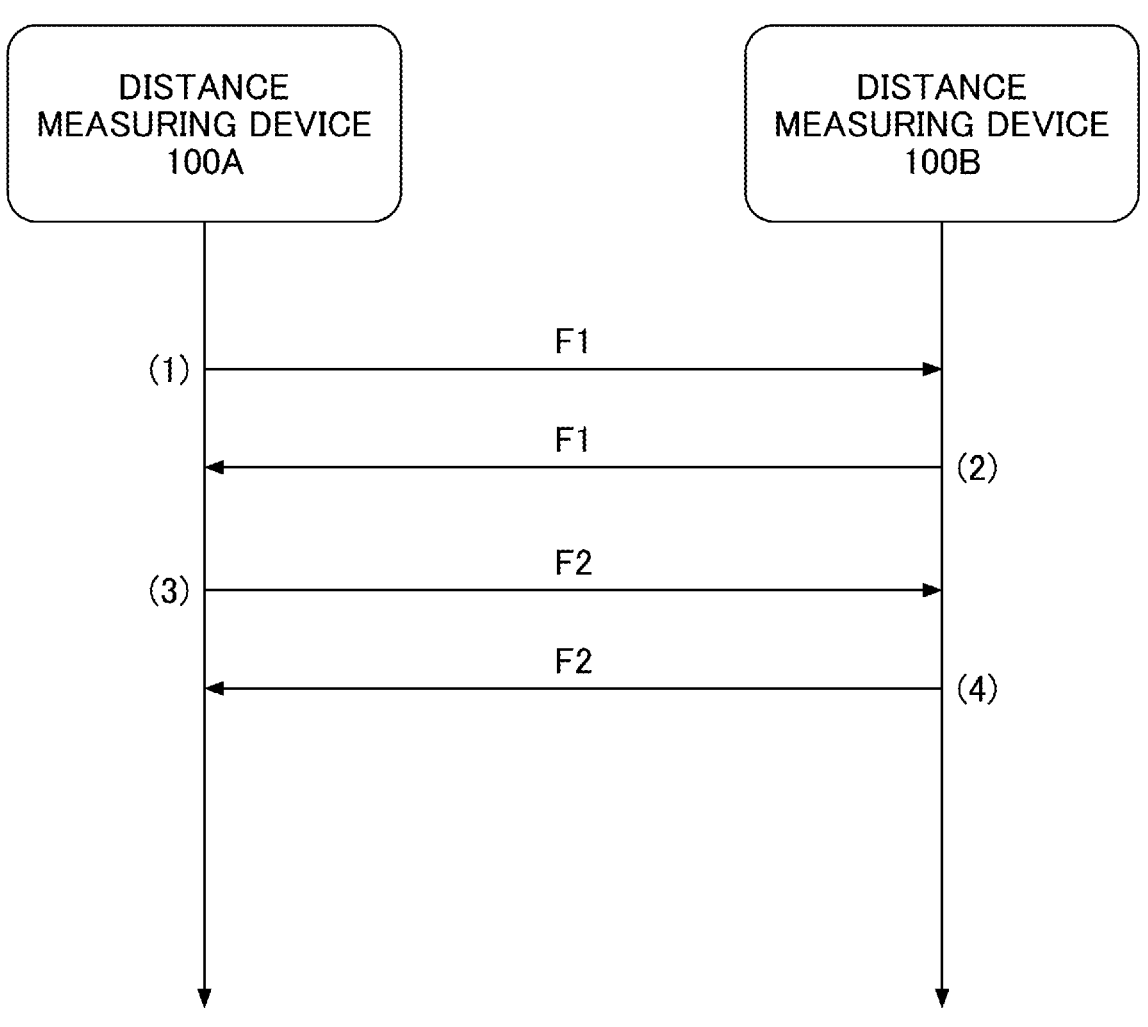
FIG. 3 is a diagram showing an example of a communication process for ranging.

FIG. 3 is a diagram illustrating an example of a communication process for ranging. In FIG. 3, the communication process is performed on a time axis expressed in a direction from top to bottom. The distance measuring devices 100A and 100B perform transmission and reception at preset frequencies. In an example, (1) the distance measuring device 100A transmits a high frequency signal with a frequency F1, and then the distance measuring device 100B receives the high frequency signal with the frequency F1 from the distance measuring device 100A. (2) The distance measuring device 100B transmits a high frequency signal with the frequency F1, and then the distance measuring device 100A receives the high frequency signal transmitted by the distance measuring device 100B. That is, in each of (1) and (2) above, the high frequency signal is transmitted and received at the same frequency F1. The distance measuring device 100A acquires a round-trip phase $\varphi 1$ of the high frequency signal transmitted at the frequency F1 and the high frequency signal received at the frequency F1. The phase $\varphi 1$ corresponds to a remainder in the division of a distance L between the distance measuring devices 100A and 100B, by a wavelength $\lambda 1$ that is derived from frequency F1. That is, $L=(n+\varphi 1) \times \lambda 1$, where N is a positive integer. In the transmission and reception in each of (3) and (4), the frequency changes to a frequency F2, and the transmission and reception are performed in the same manner as described in (1) and (2).

Figure 4:
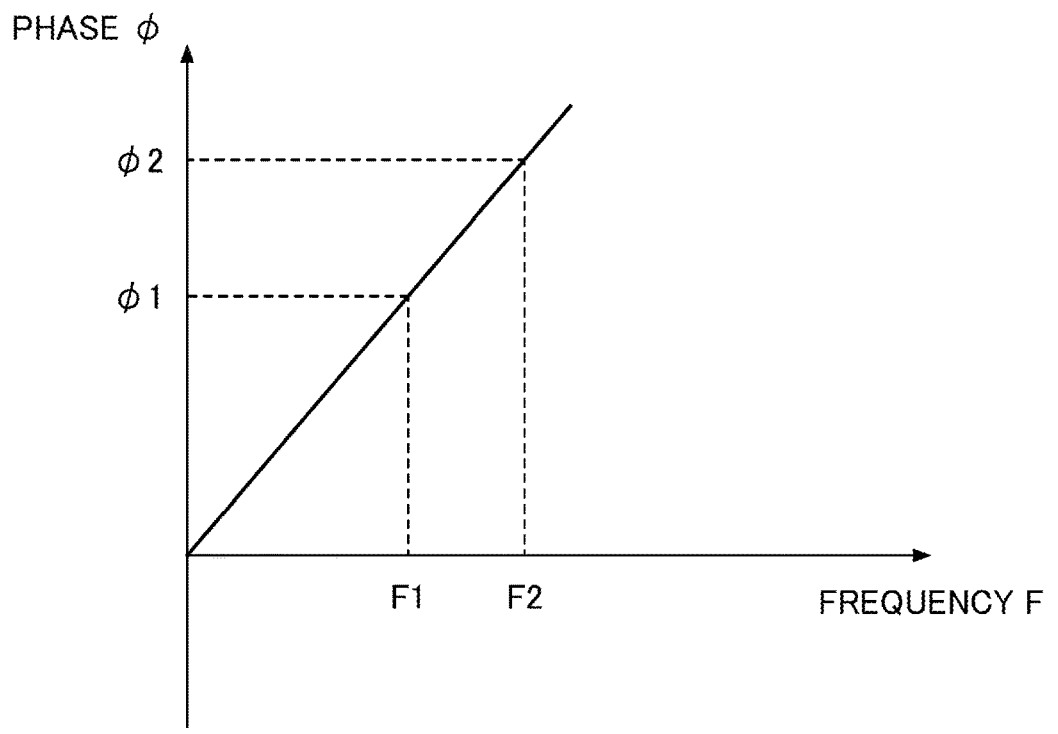
FIG. 4 is a diagram showing a phase characteristic with respect to a frequency F obtained by ranging.

FIG. 4 is a diagram showing a phase $\varphi$ with respect to a frequency F that is obtained by ranging. By performing the process described in FIG. 3, the distance measuring device 100A determines the round-trip phase $\varphi 1$ of the high frequency signal transmitted in (1) and the high frequency signal received in (2) as shown in FIG. 3, and also, the distance measuring device 100A determines a round-trip phase 42 of the high frequency signal transmitted in (3) and the high frequency signal received in (4) as shown in FIG. 3. Further, the distance measuring device 100A calculates a ratio of the distance L to a speed of light c, as a ratio of a phase difference ($\varphi 2-\varphi 1$) between phases $\varphi 1$ and $\varphi 2$ that are respectively in accordance with the frequencies F1 and F2, to a difference (F2−F1) between the frequencies F1 and F2. That is, the ratio is expressed by $L/c=((F2−F1)/(\phi 2-\phi 1))$. The distance measuring device 100A can determine the distance L by multiplying the calculated ratio by the speed of light c.

When the distance measuring devices 100A and 100B transmit and receive the high frequency signals at the frequencies F (fixed values) as shown in FIG. 3, phases of the high frequency signals received from the distance measuring device 100B are substantially the same. The oscillator circuit 121 included in each of the distance measuring devices 100A and 100B have variations in an offset of a natural frequency and variations or the like in the oscillation frequency due to temperature characteristics, but the phases of the high frequency signals that are transmitted from the distance measuring device 100B and are received by the distance measuring device 100A are substantially the same when transmitting and receiving the high frequency signals as illustrated in FIG. 3.

<Communication Process in a Case where Unauthorized Device A Exists>

Figure 5:
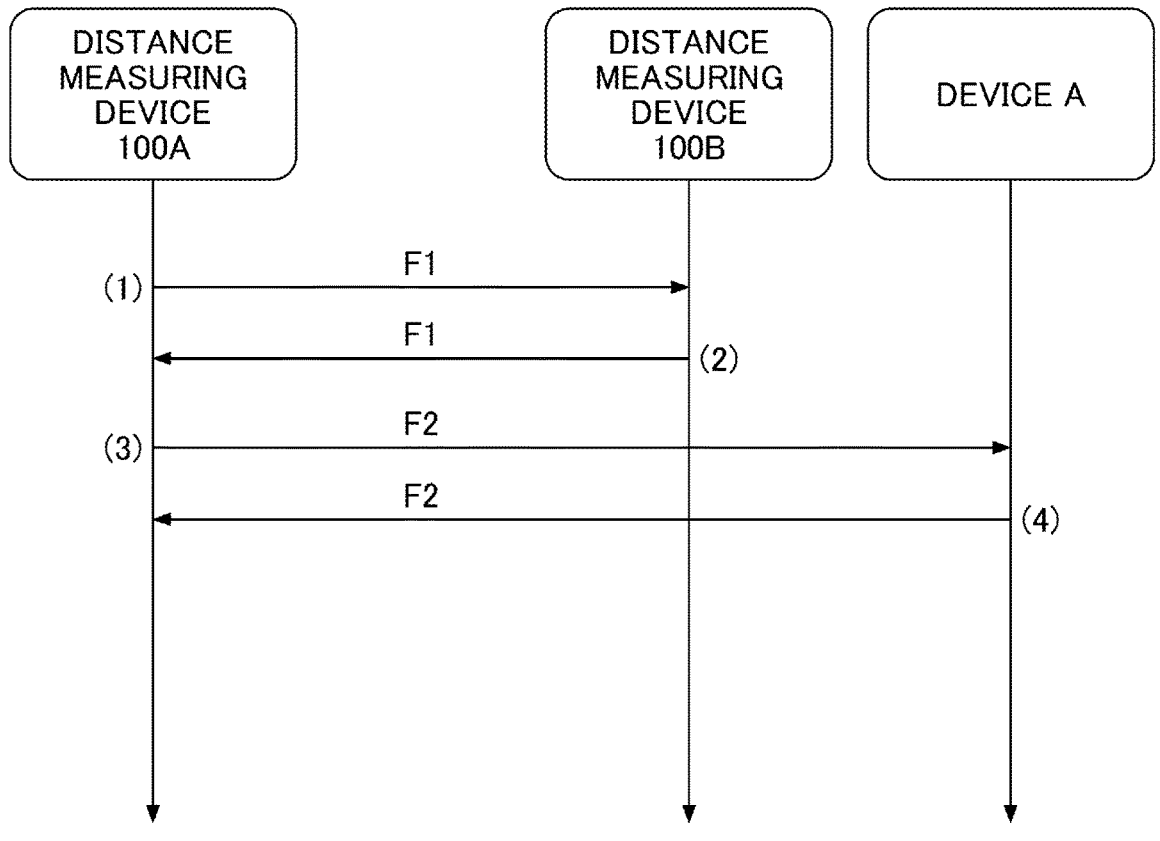
FIG. 5 is a diagram showing an example of the communication process for ranging in a case where an unauthorized device A exists.

FIG. 5 is a diagram showing an example of the communication process for ranging in a case where an unauthorized device A exists. Typically, the unauthorized device A may be a communication terminal that is operated by a person who performs a relay attack to steal the vehicle 10. It is assumed that the distance measuring devices 100A and 100B perform the transmission and reception in (1) to (3) in FIG. 3, that the device A receives the high frequency signal with the frequency F2 transmitted from the distance measuring device 100A in a result of (3), and that the distance measuring device 100A receives the high frequency signal with the frequency F2 transmitted from the device A in (4). The device A receives the high frequency signal with the frequency F2 that is to be transmitted from the distance measuring device 100A to the distance measuring device 100B, detects that the transmission and reception are performed at the frequency F2, and transmits the high frequency signal with the frequency F2 by spoofing as the distance measuring device 100B.

Figures 6, 7:
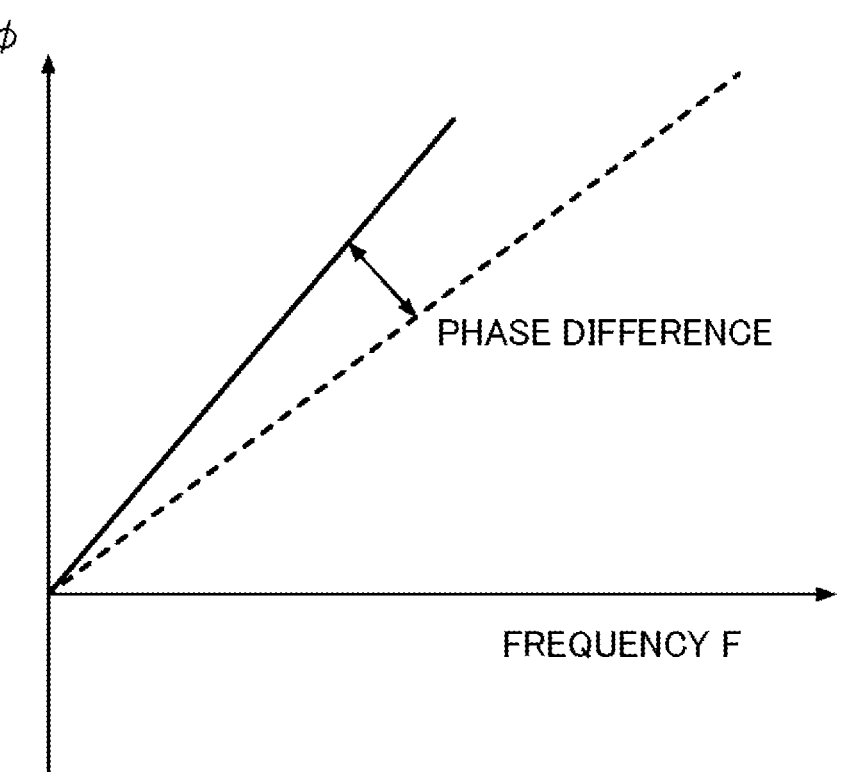
FIG. 6 is a diagram showing the phase characteristic with respect to the frequency F obtained by ranging in the case where the unauthorized device A exists.
FIG. 7 is a diagram showing an example of table data indicating frequency adjustments of a high frequency signal.

FIG. 6 is a diagram showing the phase $\varphi$ with respect to the frequency F obtained by ranging in a case where an unauthorized device A exists. Under a condition in which the distance measuring device 100A performs the transmission and reception with respect to the distance measuring device 100B as illustrated in (1) to (4) above in FIG. 5, a phase characteristic with respect to the frequency F as expressed by a solid line is determined, and also, a phase characteristic with respect to the frequency F as expressed by a broken line is determined in view of (4) above. The phase characteristic with respect to the frequency F, as expressed by the broken line, is a phase characteristic with respect to the frequency F, obtained from the high frequency signal with the frequency F that is received from the device A at a timing that is obtained in (4) above.

As described above, if the distance measuring device 100A receives the high frequency signal from the device A that is different from the distance measuring device 100B, a slope of the phase with respect to the frequency, which is obtained from the phase characteristic with respect to the frequency F that the distance measuring unit 135 determines, changes, and as a result, the resulting phase would change. From this situation, it can be determined that the distance measuring device 100A receives the high frequency signal from a device (in this example, the device A) other than the distance measuring device 100B.

As a result, if the distance measuring device 100A transmits and receives high frequency signals with respect to the distance measuring device 100B, in a case where the distance measuring device 100A receives a high frequency signal from a device (the device A in this example) other than the distance measuring device 100B, the phase characteristic with respect to the frequency F would change, and also, a temporal change in the phase characteristic would occur. Thus, it can be determined that the distance measuring device 100A receives the high frequency signal from a device (the device A in this case) other than the distance measuring device 100B.

In view of the situation described above, by positively utilizing (i) a change in the phase characteristic with respect to the frequency F and (ii) a temporal change in the phase, it is determined that the distance measuring device 100A receives the high frequency signal from a device (in this example, the device A) other than the distance measuring device 100B.

<Table Data Indicating Frequency Adjustments for High Frequency Signal>

FIG. 7 is a diagram illustrating an example of table data indicating frequency adjustments for the high frequency signal. The table data illustrated in FIG. 7 is data having a table format in which each identifier (ID) of a frequency adjustment for the high frequency signal is associated with the adjustment. The table data indicating the frequency adjustments for the high frequency signal is stored in the memory 136.

The frequency adjusting unit 122 retrieves an adjustment from shared adjustment data, according to a rule that is defined by the shared adjustment data stored in the memory 136. Then, the frequency adjusting unit 122 changes the frequency of the high frequency signal that is input from the oscillator circuit 121, to a frequency that is obtained by adding the retrieved adjustment to the fundamental frequency. Subsequently, the frequency adjusting unit 122 outputs the high frequency signal with the changed frequency, to the multiplier 123.

<Shared Adjustment Data>

FIG. 8 is a diagram illustrating an example of the shared adjustment data. The shared adjustment data defines the rule for frequencies that are used when both the distance measuring devices 100A and 100B transmit high frequency signals in the authentication process. The shared adjustment data is an example of data relating to frequencies used in communications between the distance measuring devices 100A and 100B.

The shared adjustment data includes data indicating one or more IDs of adjustments that are used in both cases where the distance measuring device 100A performs transmission to the distance measuring device 100B twice and where the distance measuring device 100B performs transmission to the distance measuring device 100A twice. A transmission order with respect to which of the distance measuring devices 100A and 100B performs the transmission is determined, such that the distance measuring device 100A first performs the transmission and next, any distance measuring device that receives a high frequency signal, among the distance measuring devices 100A and 100B, transmits the high frequency signal.

In the present embodiment, a case where each of the distance measuring devices 100A and 100B transmits the high frequency signal twice and receives the high frequency signal twice is described below, but any number of transmit-receive cycles may be adopted as long as the number of transmit-receive cycles is two or more. The shared adjustment data includes the transmission order and IDs of adjustments, for all transmit-receive cycles for high frequency signals that are performed by the distance measuring devices 100A and 100B.

In an example, the shared adjustment data indicates that the distance measuring device 100A performs the transmission to the distance measuring device 100B at a first time at which a frequency F0 is determined using an adjustment f0, and that the distance measuring device 100B performs transmission to the distance measuring device 100A at a first time at which the frequency F0 is determined using the adjustment f0. In addition, the shared adjustment data indicates that the distance measuring device 100A performs transmission to the distance measuring device 100B at a second time at which the frequency F0 is determined using the adjustment f0, and that the distance measuring device 100B performs transmission to the distance measuring device 100A at a second time at which a frequency F1 is determined using an adjustment f1. Here, the frequency F0 is an example of a first frequency, and the adjustment f0 is an example of a first adjustment. The frequency F1 is an example of a second frequency, and the adjustment f1 is an example of a second adjustment.

<Process Under Normal Condition>

FIG. 9 is a flowchart showing the sharing process, the frequency setting process, the authentication process, and the distance measuring process, under a normal condition. The normal condition is a condition in which the relay attack does is not performed by the device A. In FIG. 9, under the normal condition, a process flow will be described in which the distance measuring devices 100A and 100B perform the sharing process, subsequently the distance measuring device 100A performs the frequency setting process and the authentication process, and finally performs the ranging process. Under the normal condition, a communication partner of the distance measuring device 100A is the distance measuring device 100B as another authorized device.

First, the sharing process unit 132 of the distance measuring device 100A performs the sharing process together with the sharing process unit 132 of the distance measuring device 100B (step S1). The sharing process unit 132 of the distance measuring device 100A generates shared adjustment data and transmits the shared adjustment data to the distance measuring device 100B. For example, the distance measuring device 100A generates shared adjustment data in advance and stores the shared adjustment data in the memory 136, and subsequently, the sharing process unit 132 of the distance measuring device 100A may retrieve the shared adjustment data from the memory 136 to thereby transmit the shared adjustment data to the distance measuring device 100B. Also, in an example, with use of a random number table or the like, the distance measuring device 100A extracts an adjustment from the table data indicating frequency adjustments for the high frequency signal as shown in FIG. 7, to thereby create shared adjustment data, and subsequently, the distance measuring device 100A may transmit the shared adjustment data to the distance measuring device 100B. The distance measuring device 100A may transmit the shared adjustment data to the distance measuring device 100B, by using a packet signal, for example. As a result, the distance measuring device 100B receives the shared adjustment date, and stores the shared adjustment data in the memory 136 of the distance measuring device 100B.

After the sharing process is terminated, the distance measuring device 100A generates the high frequency signal with the frequency F0 as a high frequency signal used in a first transmission. In this case, the high frequency signal with the frequency F0 is generated using the adjustment f0 in accordance with the shared adjustment data (step S2A). Specifically, the frequency adjusting unit 122 of the distance measuring device 100A reads out the adjustment f0 according to the rule that is defined by the shared adjustment data stored in the memory 136, and then changes the frequency of the high frequency signal input from the oscillator circuit 121, to a frequency (fc+f0) that is obtained by adding the adjustment f0 to the fundamental frequency fc. Subsequently, the frequency adjusting unit 122 outputs the high frequency signal having the changed frequency to the multiplier 123. The multiplier 123 multiplies the frequency (fc+f0) and outputs the high frequency signal with the frequency F0 in the 2.4 GHz band. With this approach, the high frequency signal with the frequency F0 is generated as the high frequency signal used in the first transmission.

After the sharing process is terminated, the distance measuring device 100B generates the high frequency signal with the frequency F0 as a high frequency signal used in a first transmission, by using the adjustment f0 that is obtained in accordance with the shared adjustment data (step S2B). An approach of generating the high frequency signal with the frequency F0 is the same as that described in step S2A performed by the distance measuring device 100A.

In the first transmission, the distance measuring device 100A transmits the high frequency signal with the frequency F0 generated in step S2A to the distance measuring device 100B (step S3A).

The distance measuring device 100B receives the high frequency signal that is transmitted from the distance measuring device 100A at a first transmission (step S3B).

In the first transmission, the distance measuring device 100B transmits the high frequency signal with the frequency F0 generated in step S2B to the distance measuring device 100A (step S4B).

The distance measuring device 100A receives the first high frequency signal that is transmitted from the distance measuring device 100B at a first transmission (step S4A).

The distance measuring unit 135 of the distance measuring device 100A calculates a slope of a phase with respect to the frequency F, based on a difference in phase between the high frequency signal with the frequency F0 transmitted in step S3A and the high frequency signal with the frequency F0 received in step S4A (step S5A). The slope of the phase with respect to the frequency F, calculated by the distance measuring unit 135, is defined by a characteristic indicating the slope of the phase with respect to the frequency F as shown in FIG. 4.

The distance measuring device 100B generates a high frequency signal with the frequency F1 as a high frequency signal used in a second transmission, by using the adjustment f1 that is obtained in accordance with the shared adjustment data (step S5B). Specifically, the frequency adjusting unit 122 of the distance measuring device 100B reads out the adjustment f1 according to the rule defined by the shared adjustment data that is stored in the memory 136, and then changes the frequency of the high frequency signal that is input from the oscillator circuit 121, to a frequency (fc+f1) that is obtained by adding the adjustment f1 to the fundamental frequency fc. Subsequently, the frequency adjusting unit 122 of the distance measuring device 100B outputs the high frequency signal with the changed frequency to the multiplier 123. The multiplier 123 multiplies the frequency (fc+f1) and outputs the high frequency signal with the frequency F1 in the 2.4 GHz band. With this approach, the high frequency signal with the frequency F1 is generated as the high frequency signal used in the second transmission.

In the second transmission, the distance measuring device 100A transmits the high frequency signal with the frequency F0 generated in step S2A, to the distance measuring device 100B (step S6A).

The distance measuring device 100B receives the high frequency signal that is transmitted from the distance measuring device 100A at a second transmission (step S6B).

In the second transmission, the distance measuring device 100B transmits the high frequency signal with the frequency F1 generated in step S5B, to the distance measuring device 100A (step S7B).

The distance measuring device 100A receives the high frequency signal that is transmitted from the distance measuring device 100B at a second transmission (step S7A).

The distance measuring unit 135 of the distance measuring device 100A calculates a slope of a phase with respect to the frequency F, based on a difference in phase between the high frequency signal with the frequency F0 transmitted in step S6A and the high frequency signal with the frequency F1 received in step S7A (step S8). The difference in phase between the high frequency signal transmitted at the frequency F0 and the high frequency signal received at the frequency F1 is different from the difference in phase as described in step S5A between the high frequency signal transmitted at the frequency F0 and the high frequency signal received at the frequency F0. For this reason, the slope of the phase with respect to the frequency F calculated in step S8 is assumed to be different from the slope of the phase with respect to the frequency F calculated in step S8.

The authentication unit 134 of the distance measuring device 100A determines whether (i) the slope of the phase with respect to the frequency F calculated in step S5A by the distance measuring unit 135 and (ii) the slope of the phase with respect to the frequency F calculated in step S8 by the distance measuring unit 135 are shifted by a difference between the frequencies F0 and F1 (step S9). In step S9, it is determined whether the communication partner transmits a high frequency signal according to the rule that is defined by the shared adjustment data. The shared adjustment data is held only by the distance measuring device 100A and the distance measuring device 100B that is another authorized device. The shared adjustment data is not held by a communication partner other than the distance measuring device 100B. Such a process in step S9 is a process of determining whether the communication partner of the distance measuring device 100A is the distance measuring device 100B as another authorized device.

For example, the memory 136 of the distance measuring device 100A may store theoretical value data that is obtained by calculating a difference between a first theoretical value indicating the slope of the phase with respect to the frequency F and a second theoretical value indicating the slope of the phase with respect to the frequency F. Here, the first theoretical value is obtained when the distance measuring device 100A receives the high frequency signal having the frequency F0 after transmitting the high frequency signal having the frequency F0, and the second theoretical value is obtained when the distance measuring device 100A receives the high frequency signal having the frequency F1 after transmitting the high frequency signal with the frequency F0. In this case, in step S9, if a difference between the slope of the phase with respect to the frequency F calculated in step S5A by the distance measuring unit 135, and the slope of the phase with respect to the frequency F calculated in step S8 by the distance measuring unit 135 is within ±5% of the theoretical difference indicated by the theoretical value data that is stored in the memory 136, the authentication unit 134 of the distance measuring device 100A may determine that the slope in step S5A and the slope in step S8 are shifted by the difference between the frequencies F0 and F1.

In step S9, the authentication unit 134 of the distance measuring device 100A calculates a theoretical value of the difference indicated by the theoretical value data, and may use the theoretical value when performing the determination in step S9. In this case, the theoretical value data may not be stored in the memory 136 in advance.

When determining that the slope in step S5A and the slope in step S8 are shifted by the difference between the frequencies F0 and F1 (YES in S9), the authentication unit 134 of the distance measuring device 100A determines that authentication is successfully performed (step S10Y).

When the authentication is successfully performed, the distance measuring device 100A performs the ranging process together with distance measuring device 100B (step S11). In the ranging process, each of the distance measuring devices 100A and 100B transmits and receives high frequency signals at predetermined frequencies, then the distance measuring unit 135 of the distance measuring device 100A calculates a given slope of the phase with respect to the frequency F, based on the difference in phase between the high frequency signal transmitted to the distance measuring device 100B and the high frequency signal received from the distance measuring device 100B, and subsequently the distance measuring unit 135 of the distance measuring device 100A calculates a distance from the distance measuring device 100A to the distance measuring device 100B, based on the given slope of the phase with respect to the frequency F.

As described above, under the normal condition, a difference between slopes that are according to the rule defined by the shared adjustment data is obtained, and thus authentication is successfully performed. In this arrangement, the distance measuring device 100A can perform the ranging process together with the distance measuring device 100B as another authorized device. As a result, any door, a trunk, or the like of the vehicle 10 in which the distance measuring device 100B is mounted can be unlocked by the smart key 20 including the distance measuring device 100A.

<Process Under Abnormal Condition>

Figure 10:
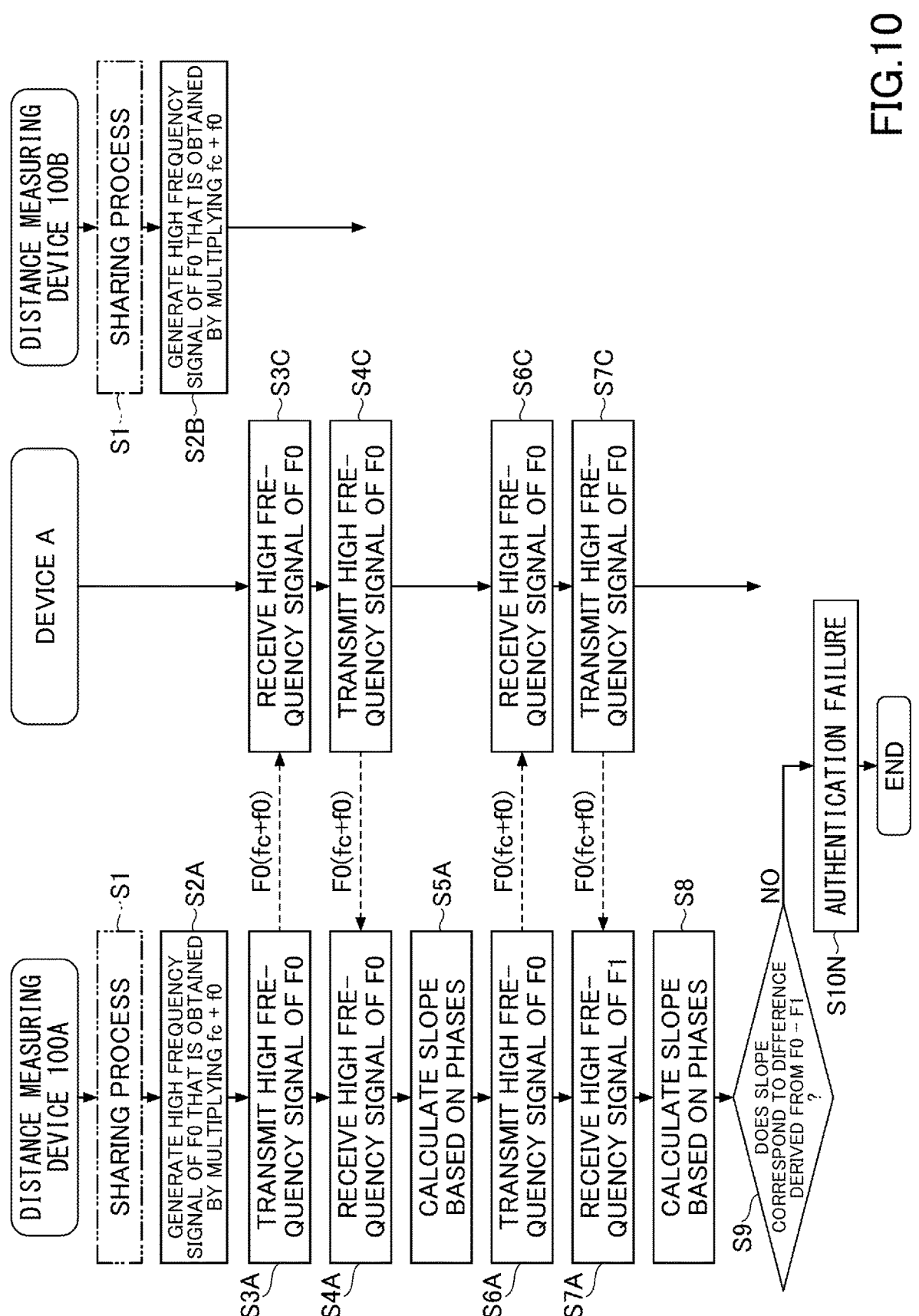
FIG. 10 is a flowchart showing the sharing process, the frequency setting process, and the authentication process, under an abnormal condition.

FIG. 10 is a flowchart illustrating the sharing process, the frequency setting process, and the authentication process, under an abnormal condition. The abnormal condition is a condition in which the relay attack is performed by the device A. In FIG. 10, a process flow in which after the distance measuring devices 100A and 100B perform the sharing process, the relay attack is performed by the device A, and subsequently, the distance measuring device 100A performs the frequency setting process and the authentication process will be described. Under the abnormal condition, authentication is not performed, and thus the distance measuring device 100A does not perform the ranging process. In FIG. 10, the same step numbers express the same processes as those illustrated in FIG. 9, and the description thereof may be omitted.

First, the sharing process unit 132 of the distance measuring device 100A performs the sharing process together with the sharing process unit 132 of the distance measuring device 100B (step S1). This step is the same as step S1 shown in FIG. 9.

After the sharing process is terminated, the distance measuring device 100A generates a high frequency signal with the frequency f0 as a high frequency signal used in a first transmission, by using the adjustment f0 that is obtained in accordance with the shared adjustment data (step S2A). Similarly, after the distance measuring device 100B terminates the sharing process, the distance measuring device 100B generates a high frequency signal with the frequency F0 as a high frequency signal used in a first transmission, by using the adjustment f0 that is obtained in accordance with the shared adjustment data (step S2B).

In the first transmission, the distance measuring device 100A transmits the high frequency signal with the frequency F0 generated in step S2A, to the distance measuring device 100B (step S3A).

At this time, the relay attack is performed by the device A, and the device A receives the high frequency signal with the frequency F0 transmitted by the distance measuring device 100A (step S3C).

While spoofing as the distance measuring device 100B, the device A generates ahigh frequency signal with the frequency F0, and then transmits the high frequency signal to the distance measuring device 100A (step S4C).

The distance measuring device 100A receives the high frequency signal with the frequency F0 transmitted from the device A as a first high frequency signal (step S4A). The distance measuring device 100A recognizes that the high frequency signal with the frequency F0 is received from the distance measuring device 100B.

The distance measuring unit 135 of the distance measuring device 100A calculates a slope of the phase with respect to the frequency F, based on a difference in phase between the high frequency signal with the frequency F0 transmitted in step S3A and the high frequency signal with the frequency F0 received in step S4A (step S5A). The slope of the phase with respect to the frequency F as calculated in step S5A is substantially the same as the slope calculated in step S5A that is performed under the normal condition as shown in FIG. 9.

In a second transmission, the distance measuring device 100A transmits the high frequency signal with the frequency F0 generated in step S2A, to the distance measuring device 100B (step S6A).

While spoofing as the distance measuring device 100B, the device A receives the high frequency signal that is transmitted from the distance measuring device 100A at a second time (step S6C).

While spoofing as the distance measuring device 100B, the device A transmits the high frequency signal with the frequency F0 to the distance measuring device 100A as a second high frequency signal (step S7C).

The distance measuring device 100A receives the second high frequency signal from the device A that spoofs as the distance measuring device 100B (step S7A).

The distance measuring unit 135 of the distance measuring device 100A calculates a slope of the phase with respect to the frequency F, based on a difference in phase between the high frequency signal with the frequency F0 transmitted in step S6A and the high frequency signal with the frequency F0 received in step S7A (step S8). Because the distance measuring device 100A receives the high frequency signal with the frequency F0 in step S7A, the calculated slope of the phase with respect to the frequency F is substantially the same as the slope of the phase with respect to the frequency F calculated in step S5A.

The authentication unit 134 of the distance measuring device 100A determines whether (i) the slope of the phase with respect to the frequency F calculated by the distance measuring unit 135 in step S5A and (ii) the slope of the phase with respect to the frequency F calculated by the distance measuring unit 135 in step S8 are shifted by the difference between the frequencies F0 and F1 (step S9).

As a result, the authentication unit 134 of the distance measuring device 100A determines that these slopes are not shifted by the difference between the frequencies F0 and F1 (NO in S9), and determines that authentication is not successfully performed (authentication failure) (step S10N).

When the authentication has failed, the distance measuring device 100A terminates a series of steps without performing the ranging process. This is because the relay attack has occurred.

As described above, under the abnormal condition, the difference between slopes is not obtained according to the rule that is defined by the shared adjustment data, and as a result, authentication is not successfully performed. Thus, the distance measuring device 100A recognizes that the communication partner is an unauthorized device. Therefore, the vehicle 10 maintains a locked state without unlocking any door, a trunk, or the like.

In this arrangement, the distance measuring device 100A shares shared adjustment data with the distance measuring device 100B, by the sharing process. Subsequently, the distance measuring device 100A authenticates the distance measuring device 100B as another authorized device, when the condition set forth below is satisfied using frequencies F0 and F1 indicated by the shared adjustment data.

(i) The distance measuring device 100A receives a high frequency signal with the frequency F0, from the distance measuring device 100B, after transmitting the high frequency signal with the frequency F0 to the distance measuring device 100B.

(ii) The distance measuring device 100A receives a high frequency signal with the frequency F1 from the distance measuring device 100B, after transmitting the high frequency signal with the frequency F0 to the distance measuring device 100B. In this case, except the distance measuring device 100A, only the distance measuring device 100B that is another authorized device holds the shared adjustment data, and an unauthorized device does not hold the shared adjustment data. In such a situation, the unauthorized device cannot perform the transmission and reception according to the rule defined by the shared adjustment data, and as a result, communications can be performed with high confidentiality.

With this arrangement, the communication device 100S, the distance measuring device 100, and an authentication method in the communication device with improved communication confidentiality can be provided.

The distance measuring device 100A includes the oscillator circuit 121 that oscillates a high frequency signal having the fundamental frequency fc, the frequency adjusting unit 122 that adjusts the frequency of the high frequency signal oscillated by the oscillator circuit 121, and the multiplier 123 that multiplies the high frequency signal having a frequency that is adjusted by the frequency adjusting unit 122. The sharing process unit 132 shares data indicating adjustments f0 and F1 that are to be each added to the fundamental frequency fc, as data relating to the frequencies F0 and F1. The frequency adjusting unit 122 generates a high frequency signal having a frequency that is obtained by adding the adjustment f0 to the fundamental frequency fc, and also, the frequency adjusting unit 122 generates a high frequency signal having a frequency that is obtained by adding to the adjustment f1 to the fundamental frequency fc. The multiplier 123 multiplies the high frequency signal having the frequency that is obtained by adding the adjustment f0 to the fundamental frequency fc, to thereby output the high frequency signal with the frequency F0. In addition, the multiplier 123 multiplies the high frequency signal having the frequency that is obtained by adding the adjustment f1 to the fundamental frequency fc, to thereby output the high frequency signal having the frequency F1.

With this arrangement, by adding each of the adjustments f0 and f1 to the fundamental frequency fc and multiplying the added frequency, high frequency signals having the respective frequencies F0 and F1 can be generated. Thus, stable operations can be performed using the oscillator circuit 121 that generates an oscillation frequency lower than the frequencies F0 and F1 of the high frequency signals to be each transmitted and received.

Further, the distance measuring device 100A includes the memory 136 that stores the adjustments f0 and f1. With this arrangement, the distance measuring device 100A can easily and reliably generate high frequency signals having frequencies F0 and F1 by using data indicating the adjustments f0 and f1 that is stored in the memory 136.

The memory 136 stores data indicating an order of use of adjustments f0 and f1. In addition, the authentication unit 134 authenticates the distance measuring device 100B as another authorized device, when a transceiver transmits a high frequency signal with a frequency F0 to a distance measuring device 100B and then receives the high frequency signal with the frequency F0 from the distance measuring device 100B, and thereafter, the transceiver transmits the high frequency signal with the frequency F0 to the distance measuring device 100B and then receives the high frequency signal at a frequency F1 from the distance measuring device 100B. In this arrangement, by adopting the order of use of the adjustments f0 and f1, accuracy in performing the authentication process can be improved. As a result, the communication device 100S, the distance measuring device 100, and the authentication method in the communication device having improved communication confidentiality can be provided.

The distance measuring device 100A has a configuration in which a distance measuring unit 135 is added to the communication device 100S. The distance measuring unit 135 of the communication device 100S measures a distance to the distance measuring device 100B that is authenticated as another authorized device by the authentication unit 134, based on the difference in phase between a high frequency signal transmitted by the distance measuring device 100A to the distance measuring device 100B and a high frequency signal received from the distance measuring device 100B. With this arrangement, the distance measuring device 100 capable of performing ranging with improved communication confidentiality can be provided.

The above embodiments are described using a case where (i) the distance measuring device 100A performs the transmission to the distance measuring device 100B at a first time at which the frequency F0 is adopted using the adjustment f0, (ii) the distance measuring device 100B performs the transmission to the distance measuring device 100A at a first time at which the frequency F0 is adopted using the adjustment f0, (iii) the distance measuring device 100A performs the transmission to the distance measuring device 100B at a second time at which the frequency F0 is adopted using the adjustment f0, and (iv) the distance measuring device 100B performs the transmission to the distance measuring device 100A at a second time at which the frequency F1 is adopted using the adjustment f1.

However, a set of frequencies (F0 and F0) used for a first transmit-receive cycle may be reversed with respect to a set of frequencies (F0 and F1) used for a second transmit-receive cycle. Also, any order of use of frequencies may be used. Even in such a case, both distance measuring devices 100A and 100B can perform the authentication process by using any set of frequencies that cannot be known by an unauthorized device, and as a result, communication confidentiality can be improved.

Although the communication device, the distance measuring device, and the authentication method in the communication device according to the exemplary embodiments of the present disclosure are described above, the present disclosure is not limited to specifically disclosed embodiments, and various modifications and changes can be made without departing from the scope set forth in the present disclosure.

A communication device, a distance measuring device, and an authentication method in the communication device with improved communication confidentiality can be provided.

What is claimed is:

1. A communication device comprising:
a processor configured to
   perform a sharing process in which data relating to a first frequency and a second frequency is shared with an external device, the first frequency and the second frequency being configured to be used to communicate with the external device,
   transmit and receive a high frequency signal with respect to the external device, and
   authenticate the external device as an authorized device, upon occurrence of a condition in which the processor receives the high frequency signal at the first frequency from the external device, after transmitting the high frequency signal at the first frequency to the external device, in conjunction with a condition in which the processor receives the high frequency signal at the second frequency from the external device, after transmitting the high frequency signal at the first frequency to the external device;
an oscillator circuit configured to oscillate the high frequency signal at a fundamental frequency;
a frequency adjusting circuit configured to adjust the fundamental frequency of the high frequency signal oscillated by the oscillator circuit; and
a multiplier configured to multiply the high frequency signal having a frequency that is obtained by adjusting the fundamental frequency by the frequency adjusting circuit,
wherein the first frequency is different from the second frequency,
wherein the frequency adjusting circuit is configured to
   generate the high frequency signal having a frequency that is obtained by adding a first adjustment to the fundamental frequency, and
   generate the high frequency signal having a frequency that is obtained by adding a second adjustment to the fundamental frequency, and
wherein the multiplier is configured to multiply the high frequency signal having the frequency that is obtained by adding the first adjustment to the fundamental frequency, and output the high frequency signal having the first frequency, and
   multiply the high frequency signal having the frequency that is obtained by adding the second adjustment to the fundamental frequency, and output the high frequency signal having the second frequency.

2. The communication device according to claim 1, further comprising:
a memory storing second data indicating the first adjustment and the second adjustment.

3. The communication device according to claim 2, wherein the memory stores third data indicating an order of use of the first adjustment and the second adjustment, and
   wherein the processor is configured to authenticate the external device as the authorized device, upon occurrence of a condition in which (i) the processor performs transmitting of the high frequency signal at the first frequency to the external device, (ii) receiving of the high frequency signal at the first frequency from the external device, (iii) transmitting of the high frequency signal at the first frequency to the external device, and (iv) receiving of the high frequency signal at the second frequency from the external device, and
   wherein (i), (ii), (iii), and (iv) are performed in this order.

4. A distance measuring device comprising:
the communication device of claim 1; and
a second processor configured to measure a distance to the external device that is authenticated as the authorized device by the communication device, based on a difference in phase between the high frequency signal transmitted by the communication device to the external device and the high frequency signal from the external device received by the communication device.

5. The communication device according to claim 1, wherein the processor is configured to determine a difference between the first frequency and the second frequency, and perform authentication based on the difference.

6. An authentication method in a communication device including a processor configured to
   perform a sharing process in which data relating to a first frequency and a second frequency is shared with an external device, the first frequency and the second frequency being configured to be used to communicate with the external device, and
   transmit and receive a high frequency signal with respect to the external device, the authentication method comprising:
   authenticating the external device as an authorized device, upon occurrence of a condition in which the processor receives the high frequency signal at the first frequency from the external device, after transmitting the high frequency signal at the first frequency to the external device, in conjunction with a condition in which the processor receives the high frequency signal at the second frequency from the external device, after transmitting the high frequency signal at the first frequency to the external device, wherein the first frequency is different from the second frequency;
   oscillating, by an oscillator circuit, the high frequency signal at a fundamental frequency;
   adjusting, by a frequency adjusting circuit, the fundamental frequency of the high frequency signal oscillated by the oscillator circuit; and multiplying, by a multiplier, the high frequency signal having a frequency that is obtained by adjusting the fundamental frequency by the frequency adjusting circuit, wherein the adjusting includes generating the high frequency signal having a frequency that is obtained by adding a first adjustment to the fundamental frequency, and generating the high frequency signal having a frequency that is obtained by adding a second adjustment to the fundamental frequency, and wherein the multiplying includes multiplying the high frequency signal having the frequency that is obtained by adding the first adjustment to the fundamental frequency, and outputting the high frequency signal having the first frequency, and multiplying the high frequency signal having the frequency that is obtained by adding the second adjustment to the fundamental frequency, and outputting the high frequency signal having the second frequency.

7. The authentication method according to claim 6, further comprising:

determining a difference between the first frequency and the second frequency; and performing authentication based on the difference.

\* \* \* \* \*